United States Patent [19]

Foster et al.

[11] Patent Number: 4,757,526
[45] Date of Patent: Jul. 12, 1988

[54] SIGNAL TRANSFER ARRANGEMENT

[75] Inventors: Eugene W. Foster, Naperville; Martin J. Glapa, St. Charles, both of Ill.

[73] Assignee: American Telephone and Telegraph Company, AT&T Bell Laboratories, Murray Hill, N.J.

[21] Appl. No.: 39,054

[22] Filed: Apr. 16, 1987

[51] Int. Cl.[4] .................. H04M 7/06; H04M 3/42
[52] U.S. Cl. .................. 379/201; 379/212; 379/229; 370/62
[58] Field of Search .......... 379/235, 231, 225, 201, 379/229, 202, 204, 205, 207, 210, 211, 212, 214; 370/62, 60

[56] References Cited

U.S. PATENT DOCUMENTS 3,859,473  1/1975  Brown et al. ................. 379/225
4,596,010  6/1986  Beckner et al. ............... 370/60
4,602,363  7/1986  Das et al. .................... 379/225 X

OTHER PUBLICATIONS

"Call Transfer Feature Document 1 and 1A ESS TM Switches" *AT&T Practice*, SPCS AT&T 231-090-079 Addendum, Issue 1, Jul., 1985.
Part V, Pages V-16 through V-19, V-65 through V-93 and V-133 through V-135 of ISDN Basic Rate Interface Specification, AT&T, 1985.

*Primary Examiner*—James L. Dwyer
*Attorney, Agent, or Firm*—Peter Visserman

[57] ABSTRACT

A telecommunication system providing centrex services, and having an attendant position serving users from diverse customer locations. Users at a satellite customer location connected to one exchange and employing ISDN terminals are provided with access to an attendant position at a main customer location connected to another exchange. ISDN messages from users at the satellite location requesting attendant services are recognized at the exchange associated with the satellite location and transmitted as analog flash signals via an analog signaling trunk to the exchange to which the attendant is connected. The exchange receiving the flash signals interpret the signals as requests for attendant services and provides the necessary connections to the attendant's position.

11 Claims, 2 Drawing Sheets

| | PROTOCOL DISCRIMINATOR | CALL REFERENCE | MESSAGE TYPE |
|---|---|---|---|
| TRANSFER REQUEST | 0000 1000 | 0000 0001 0100 0000 | 0000 0000 1001 0011 |
| TRANSFER REJECT | 0000 1000 | 0000 0001 0100 0000 | 0000 0000 1001 0101 |
| TRANSFER ACKNOWL. | 0000 1000 | 0000 0001 0100 0000 | 0000 0000 1001 0100 |

SIGNAL TRANSFER ARRANGEMENT

TECHNICAL FIELD

The invention relates to telecommunication systems and more particularly to an arrangement for providing to stations connected to one exchange the services of an attendant connected to another exchange.

BACKGROUND OF THE INVENTION

Centrex services may be provided to subscribers such as a business establishment having a main location connected to one local exchange and a remote or satellite location connected to another local exchange. In such centrex arrangements, incoming calls from outside the centrex business group come in via the main location exchange. Calls destined for the remote location are connected to a remote location station set via an interoffice trunk and the remote location exchange. A class of communication networks known as Integrated Services Digital Network (ISDN) provides subscribers with a variety of capabilities and control from the telephone station set used by the caller. ISDN centrex systems may be equipped with an attendant position from which call transfers, conferencing, etc., are controlled. ISDN station sets, also referred to as terminals, may be equipped with a "transfer" button and/or a "conference" button. Pressing these buttons during a call causes the terminal to transmit a message to the local exchange, which will bridge the attendant to the call connection to establish an audible connection with the attendant. When the party is at a remote location connected to one exchange and the attendant is at the main location connected to another exchange, the transfer/conference request must be transmitted from the one exchange to the other. In prior art analog systems customers may signal a transfer/conference request by momentary depression of the switchhook which is recognized at the local exchange as a flash. When a flash is received from a remote location in analog systems, it is transmitted to the main location exchange over an interoffice trunk equipped for analog flash signaling. In ISDN systems, communications between customer terminals and the exchange, occur by means of digitally encoded messages. Accordingly, when services of an attendant are needed, a digital message is sent to the local exchange. ISDN subscriber lines have B-channels and D-channels and all signaling messages such as "transfer" are transmitted via the D-channel. When the attendant is connected to another exchange, the ISDN message requesting attendant services must be transmitted to that exchange. A problem of prior art systems, however, is that there is no economical way to transmit the ISDN message to another exchange. Commonly available interoffice trunks are not equipped to accept and transmit ISDN messages and to provide a special interoffice trunk to handle such messages for this specific application is prohibitively expensive. Thus, in order to be able to provide communications from an ISDN terminal connected to one exchange to an attendant position connected to another exchange, another solution is desired.

SUMMARY OF THE INVENTION

In accordance with this invention, these and other problems of the prior art are solved by incorporating in one exchange the capability to respond to a digital message representing a request for attendant services and to transmit to another exchange standard analog signaling which appears to the other exchange as a switchhook flash. The other exchange will recognize the flash and communicate the request to the attendant. Advantageously, this solution does not require any modification of the available interoffice trunks. Furthermore, in a system in accordance with this invention, the user at the remote location may use the same procedures for calling an attendant as other ISDN user at the customer's main location.

In one specific embodiment of the invention, a transfer/conference message is received at a local exchange and call related data is examined to determine the identity of the relevant interoffice trunk. A switchhook flash signal is transmitted on the identified trunk and an acknowledge message is returned to the requester. In the event that the flash hook signal cannot be transmitted, a reject message is sent to the requester.

The exchange to which the attendant is connected may be an ISDN exchange which communicates with the attendant position via D-channel messages. Advantageously, in accordance with this invention, ISDN D-channel continuity is provided between ISDN exchanges using analog signaling facilities.

BRIEF DESCRIPTION OF THE DRAWING

The invention may be better understood from the following detailed description when read with reference to the drawing in which.

DETAILED DESCRIPTION

Figure 1:
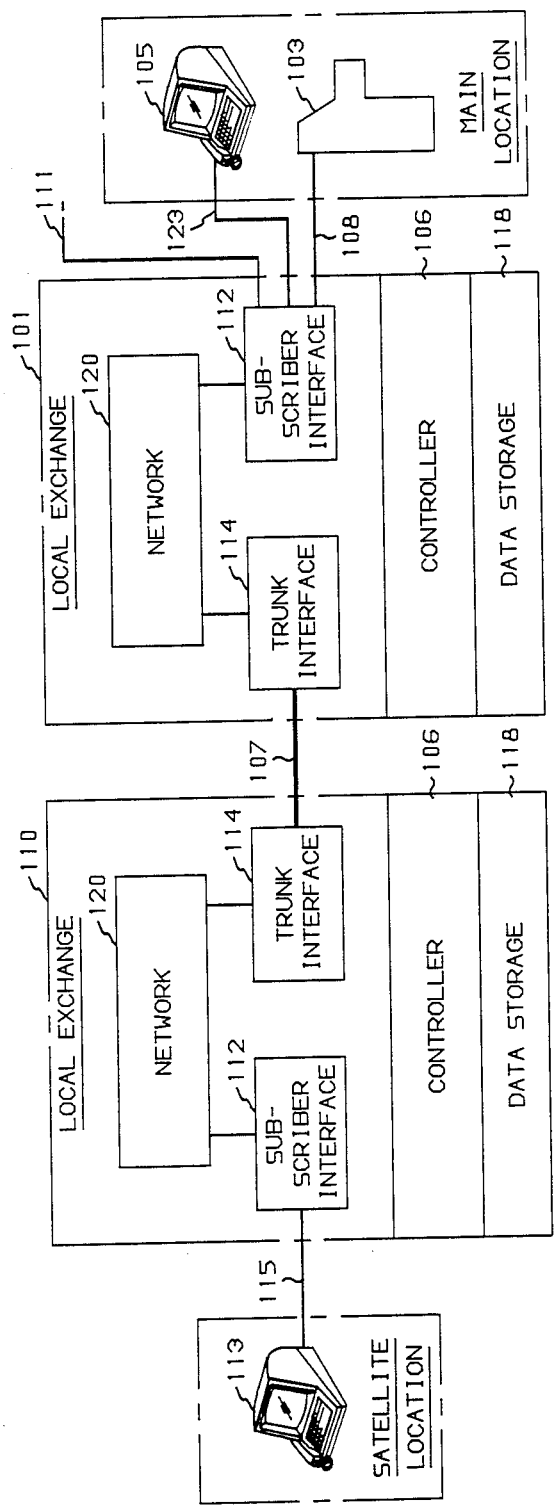
FIG. 1 is a block diagram representation of a telephone switching system including interconnected local exchanges.

FIG. 1 is a block diagram representation of an illustrative telecommunication system comprising interconnected local exchanges 101 and 110. The local exchanges 101 and 110 may comprise a well-known telecommunication switch adapted for use in the Integrated Services Digital Network (ISDN). One telecommunication switch adapted for ISDN is disclosed in the U.S. Pat. No. 4,592,048 of M. W. Beckner et al. entitled "Integrated Packet Switching and Circuit Switching System."

In this illustrative embodiment of the invention, a centrex attendant position 103 connected to exchange 101 is located in the main location of for example, a business customer who also has a satellite location connected to exchange 110. Both the main location and the satellite location will have a number of customer terminals such as the ISDN customer terminals 105 and 113. These terminals belong to the same centrex business group even though connected to different local exchanges. For the sake of simplicity, only the connections from the local exchanges to the attendant position 103 and the exemplary terminals 105 and 113 are shown on the drawing. The attendant position 103 comprises standard equipment required to control the setting up and taking down of connections in exchange 101. The attendant position and terminal 105 are connected to exchange 101 by digital subscriber line 108 and 123, respectively, and terminal 103 is connected to exchange 110 via digital subscriber line 115. The terminal 113 is an ISDN terminal which communicates with the local exchange 110 by means of ISDN messages in accordance with a well-defined protocol specified generally by the International Telegraph and Telephone Consultative Committee (CCITT) and as specifically defined in a document entitled "5ESS Switch ISDN Basic Rate Interface Specifications", and published by AT&T in 1985.

The local exchanges 101 and 110 include subscriber interface circuitry 112 for interfacing with the ISDN digital subscriber lines as well as trunk interface circuitry 114 for interfacing with an interoffice trunk 107. The subscriber interface 112 is a standard ISDN subscriber interface as shown, for example, in the above-noted of patent Beckner et al. The interoffice trunk 107 is a well-known analog trunk used for the transmission of voice and control signaling in analog format between the two offices. The signaling, for example, may be dial pulse signaling which is a commonly used form of interoffice signaling. The trunk transmission facilities may include digital circuits such as T1 circuits which transmit digitally encoded analog signals. The trunk interface circuits 114 are standard analog trunk interface circuits which are well known in the art. A switching network 120 in each of the local exchanges serves to establish connections within the exchanges. The local exchanges 101 and 110 each further include a stored program controller 106 which control functions of the local exchange including the operation of the network and interface circuits. Such controllers and their functions for controlling a switching system are well known. The local exchanges include a database system or other storage system 118 containing data relating to the operation of the local exchange including call related data and terminal data.

The user of an ISDN customer terminal 113 at the satellite location may wish to transfer an incoming call to another terminal such as terminal 105 in the main location or may wish to set up a conference to add terminal 105 to the call. By way of example, it is assumed that a call is to be transferred which originated from subscriber line 111 connected to local exchange 101. Calls destined for the satellite location terminals from subscriber lines outside of the customer group comprising the satellite location terminals come into the local exchange 101. Call control for terminals of the main location, including the attendant positions also take place in the local exchange 101. In the establishment of a call from subscriber line 111 to terminal 113, a connection will have been set up in local exchange 101. The connection will extend from line 111, via a specific interoffice trunk (e.g., 107), to local exchange 110 and via digital subscriber line 115 to terminal 113.

Figures 2, 3:
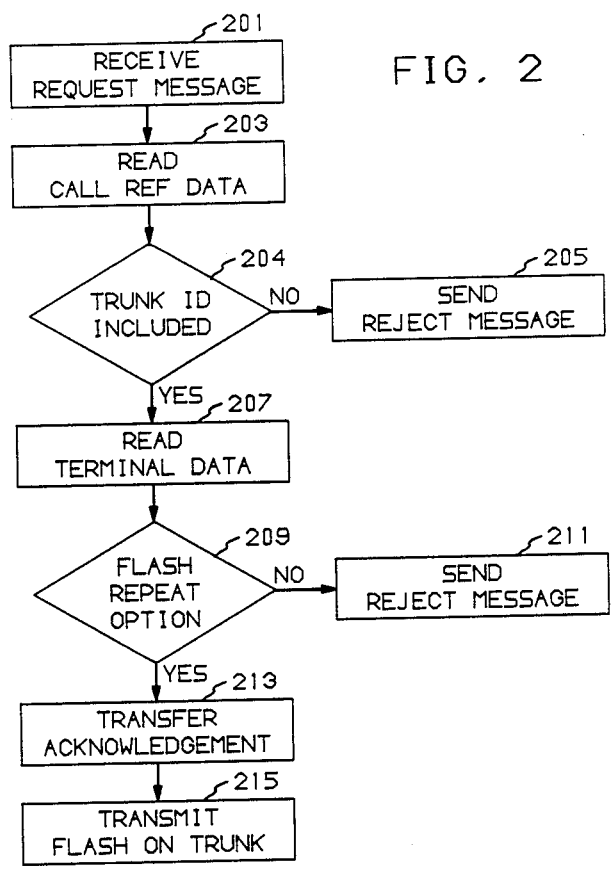
FIG. 2 is a flow diagram representation of a sequence of actions in one of the exchanges of FIG. 1.
FIG. 3 shows exemplary configurations of messages exchanged between one of the exchanges of FIG. 1 and a connected ISDN terminal.

To initiate the call transfer, the party at terminal 113 presses the appropriate call transfer button. This causes the ISDN terminal 113 to transmit a digital ISDN message to the local exchange 110. The message may take the form of the Transfer Request message outlined in FIG. 3. The message consists of several octets. The first octet of the message defines the so-called protocol discriminator which identifies ISDN protocol used in formulating and interpreting user-network call control messages. For circuit switched calls, as opposed to packet switched calls, the value of the protocol discriminator is as shown in FIG. 3. The subsequent two octets of the message serve to define a call reference number. This number is assigned when the call is established and serves to identify the call for as long as the call is maintained. The first octet of the call reference value indicates the length of the call reference and the second octet defines the call reference number. In the example used herein, the call reference number is 64 as indicated in binary in FIG. 3. The last two octets of the message serve to define message type. In this particular example, the transfer message type is as indicated in FIG. 3. The message transmitted by terminal 113 will be received at the local exchange 110 via the subscriber interface and its receipt will be detected by the controller 106 in a standard fashion.

To complete the transfer the controller 106 of local exchange 110 performs a series of functions outlined in FIG. 2. Depicted in block 201 is the receipt of an ISDN request for transfer message from, for example, terminal 113. In block 203 the controller 106 of the local exchange 110 reads call reference data from the associated data storage 118. The call reference identification is obtained from the request message received in block 201. The call reference identification is assigned to a call when the call is first established and an area in data storage related to the call reference is used to store information about the particular call, including the identity of the interoffice trunk and the terminal involved in the call. In block 204 a test is made to determine whether a trunk identification is included. It is possible for calls to be established between stations in the same satellite location which do not involve the local exchange 101 or the interconnecting trunk 107. In case of such calls, attendant services are not available and if the trunk ID is not found in the call reference data, a reject message is sent in block 205. This message, for example, may be a transfer reject message shown in FIG. 3. If the trunk ID is present, an advance is made to block 207 where data relating to the terminal identified by the call reference data is examined. This data may also be stored in the data storage 118 of exchange 110 and read by the associated controller 106. The terminal data defines subscribed feature options associated with the terminal. In block 209 this data is examined to determine whether the data includes a flash-repeat option. To determine whether this option is available, a specific bit or bits is examined which in one state indicates that the flash option is available and in another state that it is not. In the event that it is not, a reject message is transmitted to the requesting terminal in block 211, e.g., the transfer reject message shown in FIG. 3. In the event that the flash repeat option is available, an advance is made to block 213 and an acknowledge message e.g., the transfer acknowledge message shown in FIG. 3, is sent to the requesting terminal. In block 215, the controller 106 of exchange 110 controls the associated trunk interface 114 to transmit a signal equivalent to an analog flash signal on the interoffice trunk 107. Trunk 107 may be an analog trunk using dial pulse or equivalent signaling or may be a digital facility which converts the signal to digital data for the purposes of transmission.

The exchange 101 responds to the flash signal in a standard fashion to alert the attendant and to establish appropriate connections in the local exchange 101 to bridge the attendant position 103 to an existing connection between, for example, line 111 and trunk 107. In this illustrative system, the exchange 101 is an ISDN exchange which communicates with attendant position 103 and terminal 105 via ISDN messages over the subscriber line D-channel. The controller 106 in exchange 101 detects the analog flash signal on the associated trunk circuit 114 and in response generates an appropriate ISDN message at the associated subscriber interface 112. This message is transmitted to the attendant position 103 via an ISDN digital subscriber line 108 to alert attendant to the request for service. The attendant may then be bridged to the call in network 120 of exchange 101 and transfer the call, for example, to terminal 105 in a standard fashion.

The procedure outlined for a transfer request is also applicable to other requests for attendant services such as, for example, the conference request available in some ISDN systems. It is to be understood that the above-described arrangement is merely illustrative of the application of the principles of this invention; numerous other arrangements may be devised by those skilled in the art without departing from the spirit and scope of the invention described herein. It is therefore intended that such change or modifications be covered by the following claims.

What is claimed is:

1. A telecommunication switching system comprising:
   a first exchange and a second exchange and a trunk circuit interconnecting said exchanges;
   an attendant position connected to said first exchange; and
   a terminal connected to said second exchange for transmitting to said second exchange an ISDN message representing a request for service to said attendant position;
   said second exchange comprising means responsive to said ISDN messages to transmit a signal representing an analog switchhook flash to said first exchange;
   said first exchange comprising means responsive to said signal for establishing a connection between said attendant position and said trunk circuit.

2. A telecommunication system in accordance with claim 1, wherein said second exchange comprises:
   data storage means for storing data defining subscribed options and program controlled processor means for reading data from said storage means in response to receipt of said ISDN message and for transmitting said signal when said data indicates trunk flash signaling for said terminal.

3. A telecommunication switch for use in a telecommunication exchange comprising;
   subscriber interface means for connecting to a subscriber terminal;
   trunk interface means for connecting to a trunk circuit extending to another telecommunication exchange;
   processor means responsive to receipt of a digital message at said subscriber interface representing a request for attendant services to generate at said trunk interface means an analog signal representing a request for attendant services.

4. The telecommunication switch in accordance with claim 3, and further comprising data storage means for storing customer related data, said processor means being further responsive to said receipt of a digital message to read said storage means and to generate said analog signal only when predetermined data is read from said data storage means.

5. In a telecommunication system, a method of signaling requests for attendant services comprising the steps of:
   receiving an ISDN message at a first exchange in said system;
   in response to a received ISDN message representing a request for attendant services, transmitting an analog signal representing a request for attendant services from said first exchange to an other exchange in said system;
   receiving said transmitted analog signal in said other exchange; and
   transmitting an alerting signal from said other exchange to a connected attendant position in response to said received analog signal.

6. In a telecommunications system, a method of transmitting a request for attendant services from an ISDN terminal connected to a first exchange to an attendant position connected to a second exchange, comprising the steps of:
   receiving an ISDN attendant service request message from said terminal at said first exchange;
   transmitting from said first exchange to said second exchange a message in analog signaling format representing a request for attendant services; and
   transmitting an ISDN alerting message from said second exchange to said attendant position.

7. In a telecommunication exchange, a method of forwarding an ISDN request for attendant services from a requesting terminal to another exchange connected via non-ISDN compatible interexchange connection facilities, comprising the steps of:
   receiving an ISDN request for attendant services;
   reading data stored in said exchange to determine whether the requesting terminal is entitled to have the request forwarded; and
   transmitting to said other exchange via said facilities a non-ISDN signal representing a request for attendant services in a format compatible with said facilities when said requesting terminal is entitled to have the request forwarded.

8. The method in accordance with claim 7, and further comprising the step of:
   sending a rejection message to the requesting terminal when the requesting terminal is not entitled to have the request forwarded.

9. The method in accordance with claim 8, in an exchange including means for storing data relating to existing calls, and further comprising the steps of:
   identifying the call for which transfer is requested, examining stored data for the identity of interexchange connection facilities; and
   sending a rejection message to said terminal if no connection facilities are identified in said stored data.

10. A telecommunication switching system comprising:
    a first local exchange;
    a subscriber terminal;
    a digital subscriber line connecting said terminal to said first exchange;
    a second local exchange;
    an analog signaling trunk interconnecting said exchanges;
    an attendant position connected to said second exchange;
    means in said first exchange responsive to an ISDN message for request for attendant services from said terminal to generate an analog signal on said trunk; and means in said second exchange responsive to said analog signal to transmit an alerting signal to said attendant position.

11. The system in accordance with claim 10, further comprising a digital subscriber line connecting said attendant position to said second exchange and wherein:

said means in said first exchange comprises first interface means interfacing said digital subscriber line connecting said terminal to said first exchange, second interface means interfacing said analog trunk, and processor means responsive to said ISDN message received at said first interface means for generating said analog signal at said second interface means; and said means in said second exchange comprises third interface means interfacing said analog trunk, fourth interface means interfacing said digital subscriber line connecting said attendant position to said second exchange, and processor means responsive to receipt of said analog signal at said third interface means for generating an ISDN message representing said analog signal at said fourth interface means.

* * * * *